US008534842B2

(12) United States Patent
Kadotani et al.

(10) Patent No.: US 8,534,842 B2
(45) Date of Patent: Sep. 17, 2013

(54) PROJECTOR

(75) Inventors: Masato Kadotani, Matsumoto (JP); Kiyotaka Nakano, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 160 days.

(21) Appl. No.: 13/099,624

(22) Filed: May 3, 2011

(65) Prior Publication Data
US 2011/0285970 A1    Nov. 24, 2011

(30) Foreign Application Priority Data

May 19, 2010   (JP) .................................. 2010-115042

(51) Int. Cl.
*G03B 21/16*    (2006.01)
(52) U.S. Cl.
USPC .............................................. 353/52; 353/20
(58) Field of Classification Search
USPC .................... 353/52, 54, 56, 57, 58, 60, 61
See application file for complete search history.

(56) References Cited

U.S. PATENT DOCUMENTS

| | | | | |
|---|---|---|---|---|
| 8,197,067 B2 * | 6/2012 | Suzuki | ............................ | 353/20 |
| 2006/0262275 A1 * | 11/2006 | Domroese et al. | .............. | 353/20 |
| 2009/0046255 A1 | 2/2009 | Kato | | |
| 2011/0310355 A1 * | 12/2011 | Otsuka et al. | ................... | 353/31 |

FOREIGN PATENT DOCUMENTS

| | | |
|---|---|---|
| JP | 2009-36819 A | 2/2009 |
| JP | 2009-47824 A | 3/2009 |

* cited by examiner

*Primary Examiner* — William C Dowling
(74) *Attorney, Agent, or Firm* — ALG Intellectual Property, LLC

(57) ABSTRACT

A projector includes: a reflection type light modulation device which modulates received light according to image information and reflects the modulated light; a reflection type polarization plate which separates both of light supplied to the reflection type light modulation device and light modulated by the reflection type light modulation device into respective polarized lights; and a temperature measuring member which measures the temperature of the reflection type light modulation device, wherein the temperature measuring member is disposed in the rear side of the reflection type light modulation device.

5 Claims, 4 Drawing Sheets

PROJECTOR

BACKGROUND

1. Technical Field

The present invention relates to a projector.

2. Related Art

A projector which includes a light source, a light modulation device for modulating light emitted from the light source, and a projection device for expanding and projecting the modulated light is known. One of examples known as this type of projector has such a structure which includes a transmission type liquid crystal panel (transmission type light modulation device) and a pair of polarization plates between which the transmission type liquid crystal panel is disposed. The polarization plates are constituted by an entrance side polarization plate disposed on the light entrance side of the transmission type liquid crystal panel, and an exit side polarization plate disposed on the light exit side of the transmission type liquid crystal panel.

According to the projector thus constructed, the temperature of the interior of the projector is easily raised by heat generated from the entrance side and exit side polarization plates and the light modulation device having absorbed a part of light emitted from the light source device, for example. For solving this problem, a temperature measuring member for measuring the temperature of the periphery of the light modulation device is provided in the vicinity of the light modulation device so that temperature rise on the periphery of the light modulation device can be prevented by using a cooling fan disposed within the projector and supplying air based on temperature information obtained by the temperature measuring member (for example, see JP-A-2009-47824).

Moreover, a projector which includes a reflection type liquid crystal panel (reflection type light modulation device) is known (for example, see JP-A-2009-36819). According to the projector disclosed in JP-A-2009-36819, a wire grid (reflection type polarization plate) is disposed on the light entrance side of the reflection type liquid crystal panel in such a position as to be inclined to the reflection type liquid crystal panel. Polarized light having passed through the wire grid is reflected by the reflection type liquid crystal panel after modulation toward the wire grid, and again passes through the wire grid or is reflected by the wire grid toward the exit side, depending on the polarization direction of the polarized light. An exit side polarization plate is disposed on the optical path of the polarized light reflected toward the exit side in such a position as to be inclined to the wire grid. The reflection type liquid crystal panel, the wire grid, and the exit side polarization plate are fixed to an attachment member in such a manner as to produce a substantially sealed space between these components.

According to the projector shown in JP-A-2009-36819, however, the accurate temperature of the periphery of the light modulation device is difficult to be measured by using the temperature measuring member disposed between the reflection type liquid crystal panel and the wire grid, for example. In this case, temperature rise of the projector cannot be sufficiently prevented.

In case of the projector disclosed in JP-A-2009-36819, the temperature changes of the reflection type liquid crystal panel, the wire grid, and the exit side polarization plate in response to the change of input signals are different from one another. More specifically, the temperature changes of the wire grid and the exit side polarization plate are larger than the temperature change of the reflection type liquid crystal panel. Thus, the accurate temperature of the light modulation device is difficult to be determined based on the measurement of the peripheral temperature affected by the larger temperature changes of the wire grid and the exit side polarization plate.

SUMMARY

An advantage of some aspects of the invention is to provide a projector capable of accurately measuring the temperature of a reflection type light modulation device for appropriate control of the temperature of the reflection type light modulation device.

A projector according to an aspect of the invention includes: a reflection type light modulation device which modulates received light according to image information and reflects the modulated light; a reflection type polarization plate which separates both of light supplied to the reflection type light modulation device and light modulated by the reflection type light modulation device into respective polarized lights; and a temperature measuring member which measures the temperature of the reflection type light modulation device. The temperature measuring member is disposed in the rear side of the reflection type light modulation device.

According to this structure, the temperature measuring member is provided in the rear side of the reflection type light modulation device. That is, the temperature measuring member is disposed not on the light entrance side of the reflection type light modulation device affected by the temperature change of the reflection type polarization plate in response to an input signal as a change different from the temperature change of the reflection type light modulation device but on the rear surface side of the reflection type light modulation device as the side opposite to the light entrance side. In this case, appropriate temperature control of the reflection type light modulation device can be performed based on measurement of the accurate temperature of the reflection type light modulation device on the rear surface side where the temperature change is stabilized irrespective of the input signal.

It is preferable that the projector according to the above aspect of the invention further includes a support member which supports the reflection type light modulation device and the reflection type polarization plate. In this case, the support member has sealed structure which fixes the reflection type light modulation device and fixes the reflection type polarization plate.

According to this structure, the substantially sealed space is produced the reflection type light modulation device and the reflection type polarization plate by using the support member. In this case, the temperature change on the rear surface side of the reflection type light modulation device caused by air having a high temperature and flowing from the light entrance side toward the rear surface side can be prevented. Thus, the accurate temperature of the reflection type light modulation device can be measured.

It is preferable that the projector according to the above aspect of the invention further includes a heat conductive member having heat conductivity and disposed on the reflection type light modulation device. In this case, the temperature measuring member is provided on the reflection type light modulation device with the heat conductive member.

According to this structure, the temperature measuring member is provided on the reflection type light modulation device with the heat conductive member. In this case, the temperature of the reflection type light modulation device can be indirectly and more accurately measured than in a structure which has the temperature measuring member on the support member on which the reflection type light modulation device and the reflection type polarization plate are supported. Thus, appropriate temperature control of the periphery of the reflection type light modulation device can be performed based on this indirect temperature measurement information.

It is preferable that the projector according to the above aspect of the invention further includes a fixing member which fixes the heat conductive member to the reflection type light modulation device and fixes the temperature measuring member to the heat conductive member.

According to this structure, the heat conductive member is securely fixed to the reflection type light modulation device by the fixing member. Moreover, the temperature measuring member is securely fixed to the heat conductive member by the fixing member. In this case, the positions of the heat conductive member and the temperature measuring member do not shift from their fixing positions. Thus, heat generated from the reflection type light modulation device can be securely conducted to the heat conductive member, allowing indirect and more accurate measurement of the temperature of the reflection type light modulation device to be achieved. Accordingly, appropriate temperature control of the periphery of the reflection type light modulation device can be performed based on this indirect temperature measurement information.

It is preferable that the fixing member is formed by an elastic body having heat conductivity in the above aspect of the invention.

According to this structure, the fixing member is formed by an elastic body. Thus, the heat conductive member and the temperature measuring member can be securely and detachably fixed by the elastic force of the fixing member. In addition, by utilizing the heat conductivity of the fixing member, heat generated from the reflection type light modulation device can be conducted to the fixing member via the heat conductive member.

BRIEF DESCRIPTION OF THE DRAWINGS

The invention will be described with reference to the accompanying drawings, wherein like numbers reference like elements.

DESCRIPTION OF EXEMPLARY EMBODIMENT

An embodiment according to the invention is hereinafter described with reference to the drawings.
Structure of Projector FIG. 1 schematically illustrates the general structure of a projector 1.

The projector 1 modulates light emitted from a light source according to image information, and projects the modulated light on a screen (not shown). As illustrated in FIG. 1, the projector 1 includes an external housing 2 forming the external case, a projection lens 3 as a projection device, an optical unit 4, and others.

Figure 1:
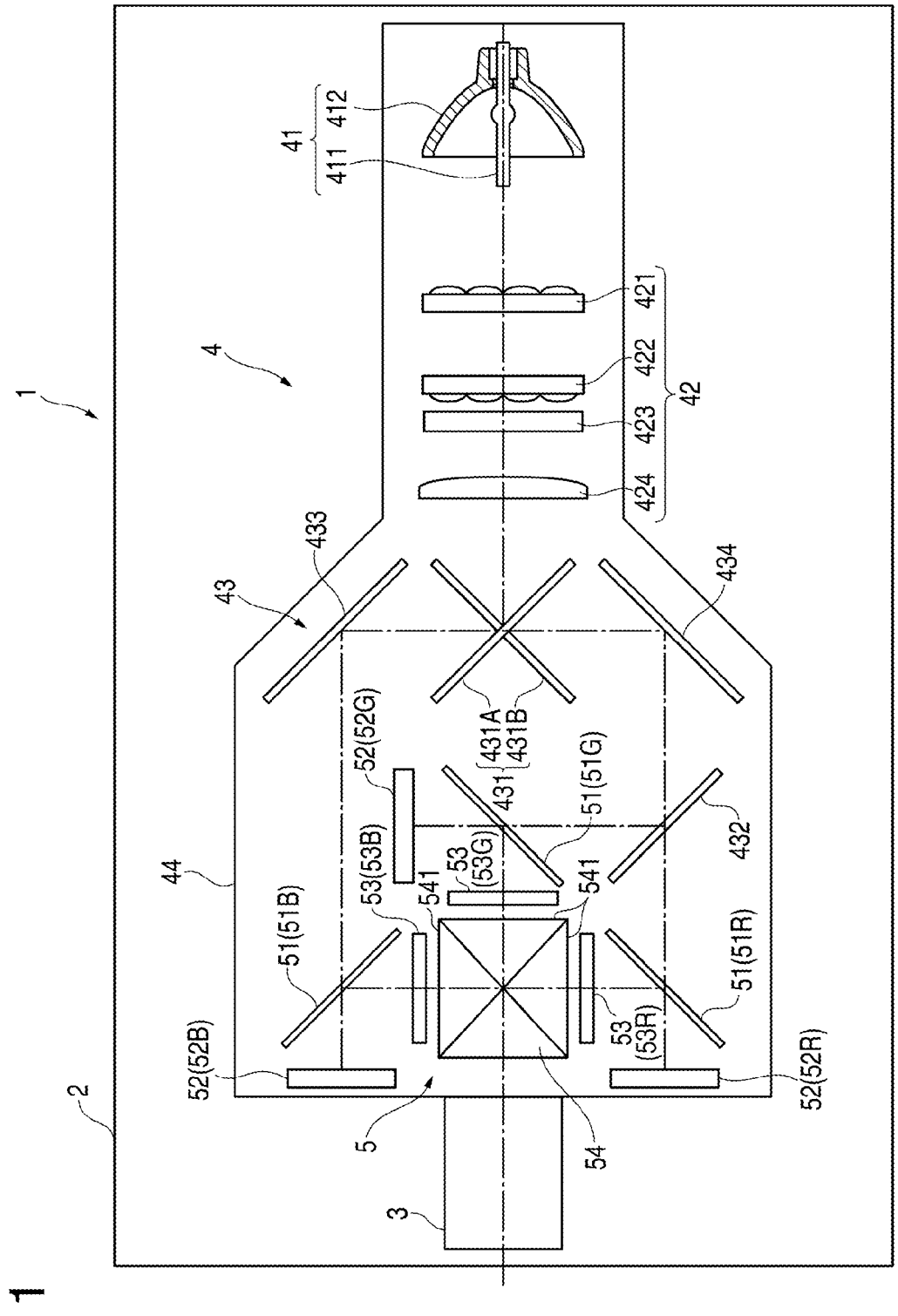
FIG. 1 schematically illustrates the general structure of a projector according to an embodiment.

The projector 1 further contains a cooling unit having a cooling fan and the like for cooling the respective components within the projector 1, a power source unit for supplying power to the respective components within the projector 1, a controller for controlling the respective components within the projector 1, and other units in the space of the external housing 2 other than the space for the projection lens 3 and the optical unit 4, all of which units other than the projection lens 3 and the optical unit 4 are not specifically shown in FIG. 1.

The controller includes a temperature control unit for controlling the temperature of the interior of the projector 1. The temperature control unit controls the operation of the cooling unit based on the temperature measurement result sent from a temperature measuring member (such as a thermistor 7 described later) for measuring the temperature of the optical unit 4.

The optical unit 4 performs optical processing for light emitted from the light source under the control of the controller. As illustrated in FIG. 1, the optical unit 4 includes a light source device 41, an illumination device 42, a color separation device 43, an optical device 5, and an optical component housing 44 in which the respective components 41 through 43 and 5 are accommodated and positioned.

The light source device 41 has a light source lamp 411, a reflector 412, and others.

The illumination device 42 has a first lens array 421, a second lens array 422, a polarization converting element 423 for converting received light into substantially one type of linearly polarized light, and a stacking lens 424.

The color separation device 43 includes a cross dichroic mirror 431 which has a B light reflection dichroic mirror 431A for reflecting blue light and a GR light reflection dichroic mirror 431B for reflecting green light and red light as mirrors disposed in X shape, a G light reflection dichroic mirror 432 for reflecting green light, and two reflection mirrors 433 and 434.

Light emitted from the light source device 41 passes through the illumination device 42, and enters the cross dichroic mirror 431 to be separated into two parts of the blue light component and the green and red light components.

The blue light separated by the cross dichroic prism 431 is reflected by the reflection mirror 433, and enters a wire grid 51B (described later) constituting the optical device 5.

The green light and red light separated by the cross dichroic mirror 431 are reflected by the reflection mirror 434, and enter the G light reflection dichroic mirror 432 to be separated into the green light component and the red light component. The green light enters a wire grid 51G (described later) constituting the optical device 5. On the other hand, the red light enters a wire grid 51R (described later) constituting the optical device 5.
Structure of Optical Device FIG. 2 is a perspective view illustrating the disassembled structure of the optical device 5.

Figure 2:
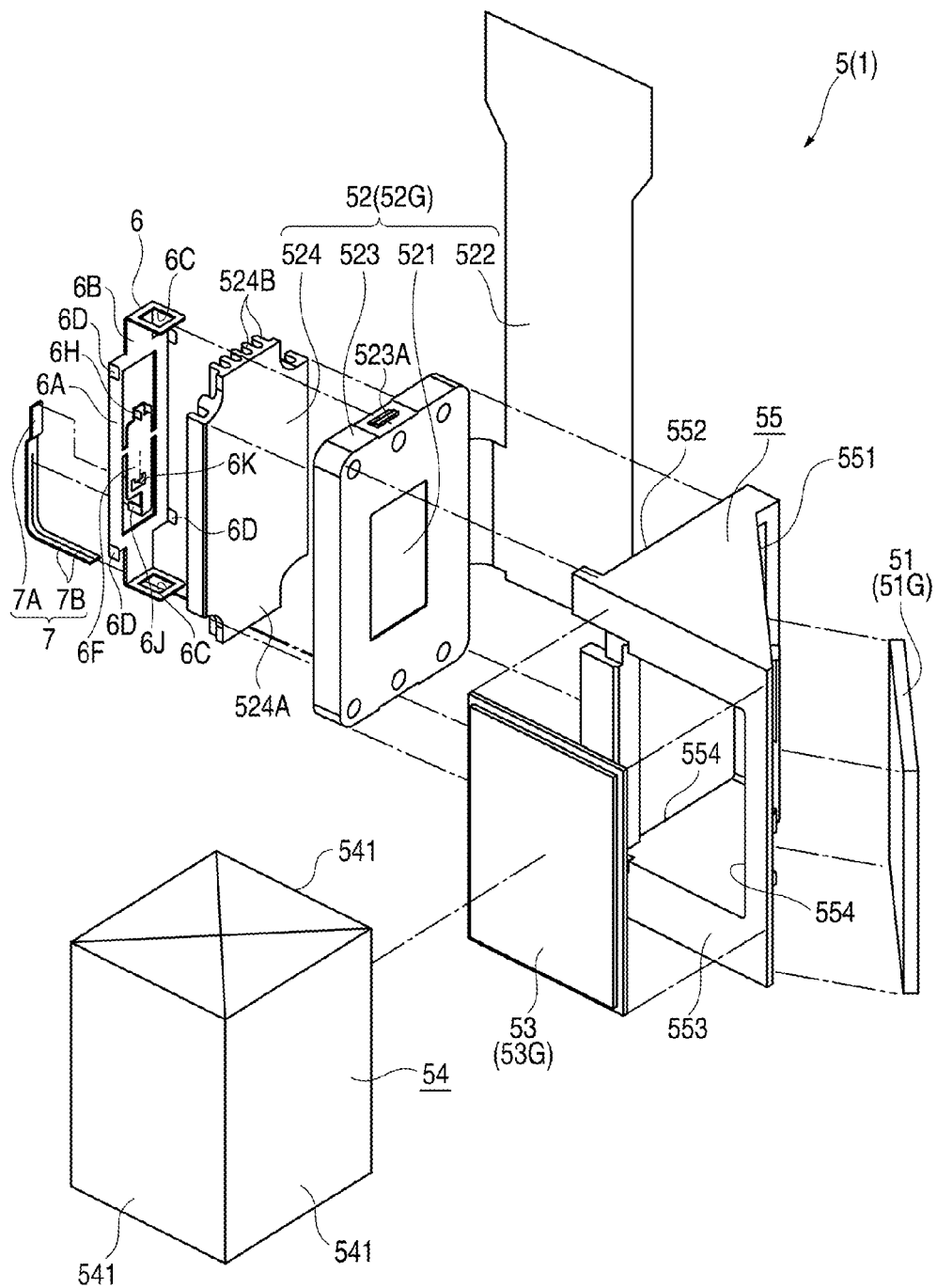
FIG. 2 is a perspective view illustrating the disassembled structure of an optical device according to the embodiment.

FIG. 2 does not show the units associated with the R and B lights in the optical device 5 but illustrates only the unit associated with the G light for convenience of explanation. However, the units for the R and B lights have structures similar to that of the unit for G light and are equipped in the similar manner.

As illustrated in FIGS. 1 and 2, the optical device 5 includes three wire grids 51 as reflection type polarization plates, three reflection type light modulation devices 52, three exit side polarization plates 53, a cross dichroic prism 54 as a color combining device, and three support members 55 (FIG. 2).

FIG. 1 shows the wire grids 51 as the wire grid 51R for red light, the wire grid 51G for green light, and the wire grid 51B for blue light for convenience of explanation. This applies to the structures of the reflection type light modulation devices 52 and the exit side polarization plates 53.

Each of the three wire grids 51 is provided to separate received light into respective polarized lights by diffraction based on grid structure. As illustrated in FIGS. 1 and 2, each of the wire grids 51 is supported by the corresponding support member 55 described later in such a position as to be inclined to the optical axis of the entering light substantially at 45°. In this arrangement, each of the wire grids 51 transmits polarized light included in the entering light and having substantially the same polarization direction as the polarization direction of the light equalized by the polarization converting element 423, and reflects polarized light included in the entering light and having the polarization direction perpendicular to the polarization direction of the light equalized by the polarization converting element 423 so that the entering light can be separated into respective polarized lights.

As illustrated in FIG. 2, each of the three reflection type light modulation devices 52 has a reflection type liquid crystal panel 521 as a device main body, an FPC 522 as a flexible wiring board, a support frame 523, and a heat sink 524 as a heat conductive member.

As illustrated in FIGS. 1 and 2, each of the reflection type light modulation devices 52 is positioned by the corresponding support member 55 described later such that the reflection type liquid crystal panel 521 crosses the optical axis of the light having passed through the corresponding wire grid 51 substantially at right angles.

The reflection type liquid crystal panel 521 is constituted by a so-called LCOS (liquid crystal on silicon) which contains liquid crystals disposed on a silicon substrate.

The FPC 522 electrically connects the controller and the reflection type liquid crystal panel 521. More specifically, one end of the FPC 522 is electrically connected with an external circuit connection terminal (not shown) provided in the vicinity of the end of the reflection type liquid crystal panel 521 corresponding to the longer side (side in the direction extending along the vertical axis) of the rectangular shape of the reflection type liquid crystal panel 521 in the plan view by contact bonding or by other methods. Furthermore, a connector (not shown) is provided at the other end of the FPC 522 so that the FPC 522 can be electrically connected with the controller via the connector.

As illustrated in FIG. 2, the FPC 522 is bended into a substantially L shape. A driving IC chip (not shown) is provided on the bended portion of the FPC 522.

The driving IC chip which includes apart of a driving circuit for driving the reflection type liquid crystal panel 521, for example, is electrically and mechanically fixed to the FPC 522.

The reflection type liquid crystal panel 521 modulates the polarization direction of the polarized light having passed through the wire grid 51 by controlling the orientation condition of the liquid crystals in response to input of image information received from the controller via the FPC 522 and the driving IC chip, and reflects the modulated light toward the wire grid 51. Then, only the polarized light having the polarization direction perpendicular to the polarization direction equalized by the polarization converting element 423 as a part of the light modulated by the reflection type liquid crystal panel 521 and reflected toward the wire grid 51 is reflected by the wire grid 51 in such a direction as to travel toward the cross dichroic prism 54.

The support frame 523 is a rectangular component in the plan view for supporting the reflection type liquid crystal panel 521, and is made of heat conductive material such as metal. The reflection type liquid crystal panel 521 supported by the support frame 523 is disposed to be opposed to a second side surface 552 of the support member 55 described later so that the reflection type light modulation device 52 can be fixed to the second side surface 552. As illustrated in FIG. 2, projections 523A each of which engages with the corresponding one of both ends of a fixing member 6 (described later) in the longitudinal direction are provided on the end surfaces of the support frame 523.

Each of the three exit side polarization plates 53 transmits the polarized light having substantially the same polarization direction as the polarization direction of the light modulated by the corresponding reflection type liquid crystal panel 521 and reflected by the corresponding wire grid 51. According to the structure adopted in this embodiment which includes both the wire grid 51 and the exit side polarization plate 53, the polarization component other than the desired linearly polarized light but reflected by the wire grid 51 can be removed by the exit side polarization plate 53.

As illustrated in FIGS. 1 and 2, each of the exit side polarization plates 53 is supported by the corresponding support member 55 described later in such a position as to be opposed to the corresponding one of light entrance surfaces 541 of the prism 54.

Each of the three support members 55 is made of heat conductive material such as metal, and supports the wire grid 51, the reflection type light modulation device 52, and the exit side polarization plate 53 for the corresponding color light of R, G, and B lights.

As illustrated in FIG. 2, the support member 55 is a hollow triangle-pole-shaped component having a horizontal cross section substantially in isosceles right triangle shape, and has a first side surface 551 as a slope, and a second side surface 552 and a third side surface 553 forming a vertical angle. Each of the side surfaces 551 through 553 has an opening 554.

The wire grid 51 is fixed to the first side surface 551. The reflection type light modulation device 52 is fixed to the second side surface 552. The exit side polarization plate 53 is fixed to the third side surface 553.

The respective openings 554 are sealed when the wire grid 51, the reflection type light modulation device 52, and the exit side polarization plate 53 are fixed to the corresponding side surfaces 551 through 553. That is, a sealed structure producing a substantially sealed space is formed between the wire grid 51, the reflection type light modulation device 52, and the exit side polarization plate 53. This arrangement allows the reflection surface of the reflection type liquid crystal panel 521 to be disposed within the sealed space, and thus prevents adhesion of dust to the wire grid 51 and the reflection surface of the reflection type light modulation device 52. Moreover, the temperature of the air inside the sealed structure is variable but has only limited effect on the outside of the support member 55 due to the sealed structure of the support member 55.

The heat sink 524 has a rectangular plate-shaped base 524A in the plan view, and a plurality of fins 524B extending from the base 524A. The heat sink 524 receives heat conducted from the reflection type liquid crystal panel 521 and the support frame 523, and releases the heat from the plural fins 524B. The heat sink 524 is made of heat conductive material such as metal.

The surface of the base 524A opposite to the surface from which the fins 524B project is attached to the rear surface of the support frame 523 (the surface of the support frame 523 opposite to the surface disposed to be opposed to the second side surface 552 of the support member 55). The side of the reflection type light modulation device 52 to which the heat sink 524 is attached corresponds to the rear surface side of the reflection type light modulation device 52. The base 524A has a shape coinciding with the shape of the rear surface of the reflection type light modulation device 52 to increase the contact area therebetween.

The reflection type light modulation device 52G has the fixing member 6 and the thermistor 7 as the temperature measuring member. The thermistor 7 is provided on the reflection type light modulation device 52G whose temperature easily increases due to the largest quantity of heat generation among the three reflection type light modulation devices 52.

Figure 3:
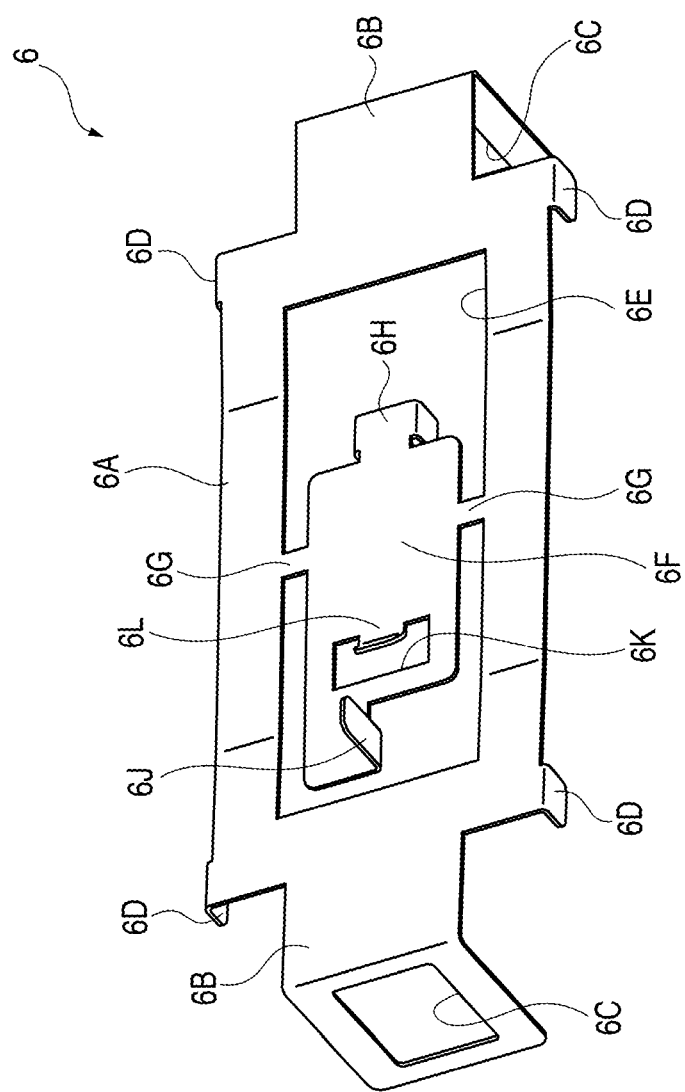
FIG. 3 is a perspective view of a fixing member according to the embodiment.

FIG. 3 is a perspective view illustrating the fixing member 6.

Figure 4:
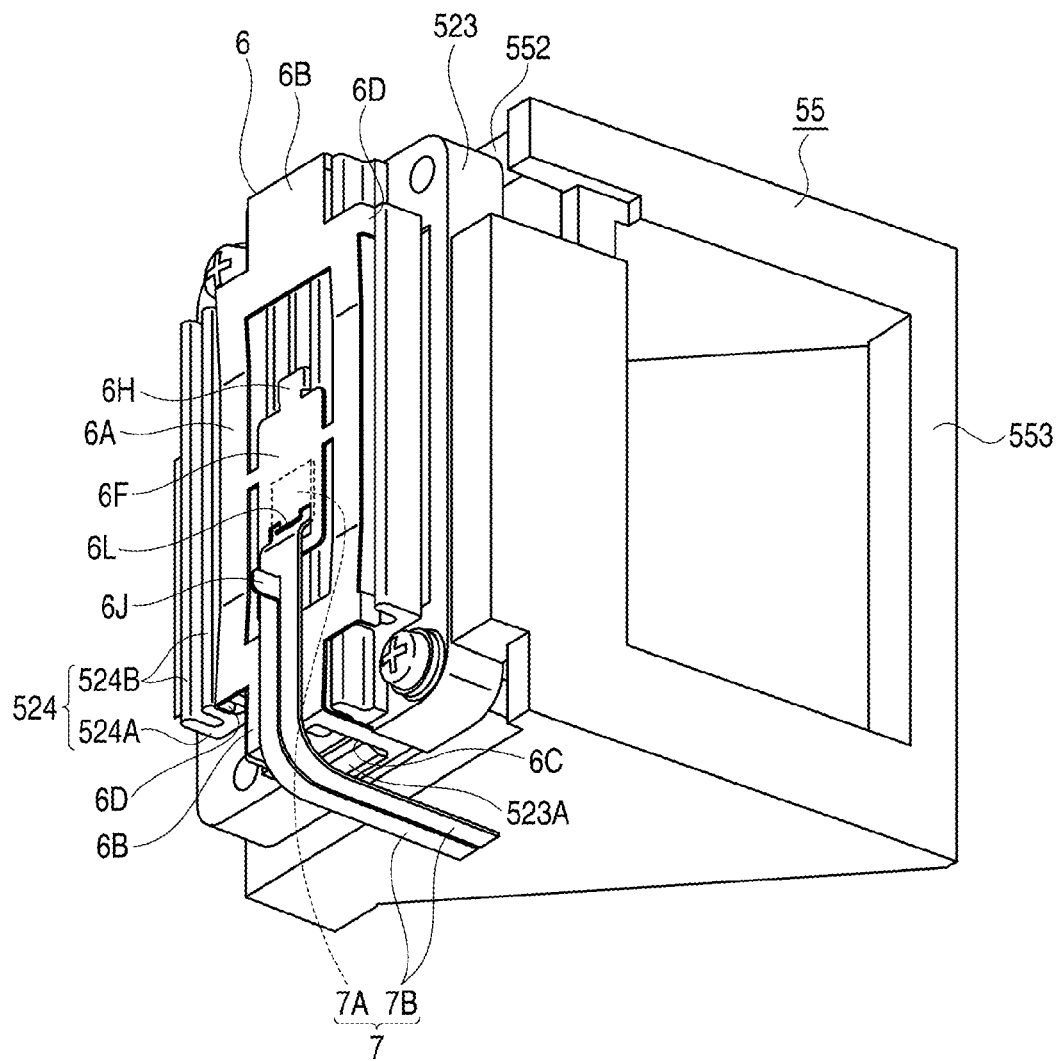
FIG. 4 is a perspective view illustrating a temperature measuring member attached to a heat conductive member by using the fixing member.

FIG. 4 is a perspective view illustrating the heat sink 524 and the thermistor 7 fixed to the support frame 523 by the fixing member 6.

The fixing member 6 is a component for supporting the heat sink 524, and for fixing the heat sink 524 to the support frame 523 and fixing the thermistor 7 to the heat sink 524.

It is preferable that the fixing member 6 is made of elastic material and heat conductive material such as metal. In this embodiment, the fixing member 6 is constituted by a flat spring having both heat conductivity and elasticity.

As illustrated in FIG. 3, the fixing member 6 has projecting portions 6B on the shorter sides of a rectangular main body 6A in the plan view as portions bended substantially in L shapes and projecting from the shorter sides. A side surface opening 6C is formed at each ends of the projecting portions 6B.

Moreover, as illustrated in FIG. 3, the fixing member 6 has four claws 6D at the ends of the longer sides of the main body 6A as portions projecting substantially in the same direction as the extending directions of the projecting portions 6B. The claws 6D each disposed at the corresponding one of both ends of the two longer sides are provided in such positions that each opposed pair of the claws 6D on the opposed longer sides can face to each other.

The fixing member 6 is located in such a position that the projecting directions of the projecting portions 6B and the claws 6D extend toward the support frame 523, and is fixed to the support frame 523 by engagement between the side surface openings 6C and the projections 523A provided on the support frame 523 while supporting the heat sink 524 between the fixing member 6 and the support frame 523. Moreover, the fixing member 6 is fixed to the heat sink 524 by insertion of the four claws 6D into the spaces between the plural fins 524B of the heat sink 524 and engagement between the claws 6D and the side surfaces of the fins 524B such that the fins 524B can be sandwiched between the claws 6D. When the fixing member 6 as the flat spring is fixed to the support frame 523 and the heat sink 524 with elastic deformation of the projecting portions 6B and the claws 6D, the fixing force of the fixing member 6 increases. In addition, the fixing member 6 having elasticity can be fixed in such a manner that the heat sink 524 and the thermistor 7 are detachable from the fixing member 6.

The main body 6A of the fixing member 6 has a main body opening 6E opened substantially in a rectangular shape. The main body opening 6E has a pressing portion 6F having a substantially rectangular shape in the plan view. The pressing portion 6F presses the thermistor 7 against the heat sink 524 to fix the thermistor 7 thereto. The main body 6A and the pressing portion 6F have substantially the same thickness.

The pressing portion 6F is disposed in such a position that the longer side of the pressing portion 6F extends along the longer side of the main body 6A, and is connected with the main body 6A via connecting portions 6G. The pressing portion 6F has claws 6H on one shorter side, a rising portion 6J on the other shorter side, and an insertion opening 6K in the vicinity of the shorter side where the rising portion 6J is provided.

The claws 6H project substantially in the same direction as the projection directions of the claws 6D. The claws 6H engage with the side surfaces of the fin 524B in such a condition that the fin 524B is sandwiched between the claws 6H when the fixing member 6 is fixed to the heat sink 524.

The rising portion 6J rises from the surface of the main body 6A substantially in the vertical direction and in the direction opposite to the extending directions of the claws 6D and 6H.

The insertion opening 6K is a substantially rectangular opening into which a measuring portion 7A of the thermistor 7 described later is inserted from the rising portion 6J side. A guide portion 6L is formed on one side of the insertion opening 6K to facilitate insertion of the measuring portion 7A into the insertion opening 6K. The guide portion 6L projects from the surface of the main body 6A substantially in the diagonally upward direction.

The thermistor 7 in this embodiment measures the temperature of the reflection type liquid crystal panel 521 via the temperature of the heat sink 524. As illustrated in FIGS. 1 and 4, the thermistor 7 has the measuring portion 7A for measuring the temperature and a fetch terminal unit 7B from which temperature measurement information obtained by the measuring portion 7A is transmitted.

The measuring portion 7A is closely fixed to the fins 524B of the heat sink 524 to measure the temperature of the heat sink 524.

When the measuring portion 7A is inserted through the insertion opening 6K into the space between the pressing portion 6F and the heat sink 524, the pressing portion 6F is raised by the thickness of the thermistor 7. As a result, the pressing portion 6F and the connecting portions 6G formed by the flat spring are elastically deformed. In this case, the thermistor 7 is pressed by the restoring force of the pressing portion 6F and the connecting portions 6G, and thus is closely fixed to the heat sink 524.

The fetch terminal unit 7B is branched at the measuring portion 7A into two parts to produce a pair of terminals. Each of the pair of the terminals is connected with the temperature control unit as one component of the controller described above. When the thermistor 7 is attached to the heat sink 524, the rising portion 6J comes to be sandwiched between the respective terminals of the fetch terminal unit 7B. In this condition, the position of the thermistor 7 does not shift from the proper position.

The temperature measuring member is not limited to the thermistor but may be a thermocouple or other thermo-sensitive devices.

According to this embodiment, the following advantages can be offered.

The thermistor 7 is provided on the rear surface side of the reflection type light modulation device 52 with the heat sink 524. That is, the thermistor 7 is disposed not on the light entrance side of the reflection type light modulation device 52 affected by the temperature change of the wire grid 51 in response to the input signal as a change different from the temperature change of the reflection type light modulation device 52 but on the rear surface side of the reflection type light modulation device 52. In this case, appropriate temperature control of the reflection type light modulation device 52 can be performed based on measurement of the accurate temperature of the reflection type light modulation device 52 on the rear surface side where the temperature change is stabilized irrespective of the input signal.

The space between the reflection type light modulation device 52 and the wire grid 51 is sealed by the support member 55. In this case, the temperature change on the rear surface side of the reflection type light modulation device 52 caused by air having a high temperature and flowing from the light entrance side toward the rear surface side can be prevented. Thus, the accurate temperature of the reflection type light modulation device 52 can be measured.

Secure fixing of the heat sink 524 to the reflection type light modulation device 52 and secure fixing of the thermistor 7 to the heat sink 524 can be both achieved by using the fixing member 6. Thus, the positions of the heat sink 524 and the thermistor 7 do not shift from their proper fixing positions. In this case, heat generated from the reflection type light modulation device 52 can be securely conducted to the heat sink 524, allowing more accurate measurement of the temperature of the heat sink 524 to be achieved. Accordingly, the temperature of the reflection type light modulation device 52 can be indirectly and more accurately measured.

The fixing member 6 is constituted by the flat spring having elasticity. Thus, the heat sink 524 and the thermistor 7 can be securely and detachably fixed by the elastic force of the fixing member 6.

The fixing member 6 is constituted by the flat spring having heat conductivity. Thus, heat generated from the reflection type light modulation device 52 can be conducted to the fixing member 6 via the heat sink 524.

The invention is not limited to the embodiment described herein but includes various modifications, improvements and the like of the embodiment without departing from the scope of the invention.

According to this embodiment, each of the reflection type polarization plates is constituted by the wire grid 51. However, reflection type polarization plates having other structures may be used as long as they function as the reflection type polarization plates.

For example, each of the reflection type polarization plates may be a polarization separation element including dielectric multilayer film, a layered polymer polarization plate on which layers of organic material having refractive index anisotropy (double refraction) such as liquid crystal are laminated, an optical element as a combination of a ¼ wavelength plate and a circular polarization reflection plate which separates light having no polarization into circularly polarized light in the clockwise direction and circularly polarized light in the anticlockwise direction, an optical element which separates polarized light for reflection from polarized light for transmission based on Brewster's angle, or a hologram optical element using hologram.

The thermistor 7 fixed by the pressing portion 6F substantially at the center of the fixing member 6 in this embodiment as shown in FIG. 4 is not required to be fixed at this position. For example, the thermistor 7 may be fixed to an end of the main body 6A.

According to this embodiment, the thermistor 7 is fixed to the reflection type light modulation device 52 with the heat sink 524. However, the thermistor 7 may be directly fixed to the reflection type light modulation device 52, or may be fixed between the reflection type light modulation device 52 and the heat sink 524.

According to this embodiment, the optical device 5 for the G light has been discussed. However, the structure of the invention may be applied to the unit for the R light or the unit for B light, or may be applied to each of the units for the R, G, and B lights.

Accordingly, the technology of the invention can be incorporated in a projector as preferable application.

The present application claim priority from Japanese Patent Application No. 2010-115042 filed on May 19, 2010, which is hereby incorporated by reference in its entirety.

What is claimed is:

1. A projector comprising:
a reflection type light modulation device having a reflection type panel which modulates received light according to image information and reflects the modulated light;
a reflection type polarization plate which separates both of light supplied to the reflection type light modulation device and light modulated by the reflection type light modulation device into respective polarized lights;
a heat sink disposed on a rear portion of the reflection type light modulation device; and
a temperature measuring member which measures the temperature of the reflection type light modulation device,
wherein the temperature measuring member is disposed against the heat sink on a rear side of the heat sink opposite the reflection type panel.

2. The projector according to claim 1, further comprising:
a support member which supports the reflection type light modulation device and the reflection type polarization plate,
wherein the support member has sealed structure which fixes the reflection type light modulation device and fixes the reflection type polarization plate.

3. The projector according to claim 1:
wherein the heat sink is a heat conductive member having heat conductivity.

4. The projector according to claim 1, further comprising a fixing member which fixes the heat sink to the reflection type light modulation device and fixes the temperature measuring member to the heat sink.

5. The projector according to claim 4, wherein the fixing member is formed by an elastic body having heat conductivity.

* * * * *